United States Patent [19]

Gergely

[11] 4,452,821

[45] Jun. 5, 1984

[54] CONFECTIONERY PRODUCT, PARTICULARLY CHEWING GUM, AND PROCESS FOR ITS MANUFACTURE

[76] Inventor: Gerhard Gergely, Gartengasse 8, A-1053 Vienna, Austria

[21] Appl. No.: 332,057

[22] Filed: Dec. 18, 1981

[51] Int. Cl.$^3$ .......................... A23G 3/30; A23G 3/00
[52] U.S. Cl. ...................................... 426/5; 426/660; 426/103; 426/98; 424/48; 252/356
[58] Field of Search ........................ 426/3-6, 426/98, 651, 99, 650; 424/48; 252/356

[56] References Cited

U.S. PATENT DOCUMENTS

| | | | |
|---|---|---|---|
| 2,566,410 | 9/1951 | Griffin | 426/651 |
| 2,785,983 | 3/1957 | McMath | 426/651 |
| 2,886,445 | 5/1959 | Rosenthal et al. | 426/651 |
| 2,929,723 | 3/1960 | Schultz et al. | 426/651 |
| 3,628,968 | 12/1971 | Noznick et al. | 426/651 |
| 3,664,963 | 5/1972 | Pasin | 426/651 |
| 3,826,847 | 7/1974 | Ogawa et al. | 426/3 |
| 3,857,964 | 12/1974 | Yolles et al. | 426/3 |
| 3,906,116 | 9/1975 | Quesnel et al. | 426/651 |
| 3,949,094 | 4/1976 | Johnson et al. | 426/650 |

*Primary Examiner*—Jeanette M. Hunter
*Attorney, Agent, or Firm*—Jordan and Hamburg

[57] ABSTRACT

The present invention is directed to a confectionery product, especially a chewing gum, having prolonged, extended delivery of flavoring, aroma, and/or active pharmaceutical ingredient. This is accomplished by providing the flavoring, aroma, or active pharmaceutical ingredient in a solid solution or mixture within a wax containing functional groups, said wax forming a homogeneous mixture or solid solution with a wax not containing any functional groups and substantially immiscible with the flavoring, aroma, or active pharmaceutical ingredient.

18 Claims, No Drawings

CONFECTIONERY PRODUCT, PARTICULARLY CHEWING GUM, AND PROCESS FOR ITS MANUFACTURE

BACKGROUND OF THE INVENTION AND PRIOR ART STATEMENT

The present invention relates to a confectionery product, particularly chewing gum, as well as to a process for manufacturing the same. In this product, at least one of the flavoring, aroma and/or active ingredient is released over a period of time, so that during consumption of the product, the effect of these materials is of long duration and does not disappear after just a few minutes as is the case with commercially available chewing gum products, with the tasteless chewing gum mass remaining in the mouth. The invention, though, is not restricted to confectionery products such as chewing gum, but also embraces products such as bonbons, caramel, hard candies, dragées, gel-and gelatin-confectioneryproducts and similar articles which contain flavorings, aromas, and/or active ingredients as described below and to a process for their production.

Chewing gums with sustained delivery of flavor are already known, but they have the disadvantage that they are comparatively difficult to manufacture and that they have not satisfied expectations of sustained delivery of flavor.

U.S. Pat. No. 3,795,744, for instance, describes a method for manufacturing a chewing gum according to which a polyvinyl ester is dissolved in a solvent, a flavoring is dispersed in the resulting solution, and the solution is thereafter mixed with a second solvent which is miscible with the first solvent but is a non-solvent for the polyvinyl ester, thereby causing the polyvinyl ester to precipitate in the shape of small particles which encapsulate the flavoring. The product obtained by this method is separated from the solvents and added to a chewing gum base, which then releases flavor over a period of time.

This method has the obvious disadvantage that large amounts of a solvent have to be handled, because precipitation of a polyvinyl ester in the form of discrete particles from concentrated solutions is not possible, and that the preparation of the solutions as well as the separation and drying of the precipitated product is relatively time consuming and uneconomical.

SUMMARY OF THE INVENTION

The present invention relates to a confectionery product, particularly a chewing gum with sustained delivery of at least one flavoring, aroma or active ingredient, the manufacture of which proceeeds in an extremely simple manner and without the use of solvents or precipitation process.

Thus the object of the invention is a confectionery product, particularly chewing gum, comprising a base and additives, like syrup, sugar, coloring, flavoring, aroma and/or active ingredient, wherein the flavoring, aroma and/or active ingredient are part of at least one of the phases forming the product, comprising at least one wax without functional groups with which the flavoring, aroma or active ingredient is substantially immiscible, and at least one second wax with functional groups which contains the flavoring, aroma or active ingredient in a solid solution or mixture and which in turn forms a homogeneous mixture or a solid solution with the wax without a functional group.

An additional object of the invention is a process for the preparation of a confectionery product, particularly a chewing gum, wherein at least one flavoring, aroma and/or active ingredient is mixed with a melt of a wax with functional groups, this melt is added to a melt of a wax without functional groups with which the flavoring, aroma and/or active ingredient is not miscible, and the molten mass, or the comminuted mass after solidification is mixed into a melt or paste of confection base.

DETAILED DESCRIPTION OF PREFERRED EMBODIMENTS

Within the scope of the present invention, the designation "waxes" according to the definition published in Fats, Soaps, Paints 56 153 (1954) refers to materials usually having the following properties: 20° kneadable solid or brittle-hard, coarse-to fine-crystalline, translucent to opaque, but not glasslike, melting above 40° C. without decomposition and not stringy, consistency and solubility strongly temperature dependent, polishable under slight pressure. Thus the designation "wax" includes in addition to the vegetable waxes, the insect waxes and the fossil waxes, the natural and the synthetic paraffin waxes, as well as the solid hydrocarbons.

Waxes without functional groups are predominantly solid aliphatic hydrocarbons of varying constitution and are generally called paraffin waxes.

Paraffin waxes are mainly natural products, though some are manufactured synthetically. Examples or paraffin waxes are those from mineral oil, particularly microcrystalline paraffin waxes, as well as polyethylene-waxes and polyglycols.

Waxes with functional groups advantageously used for the purpose of the invention are higher fatty alcohols having waxlike consistency (waxy alcohols), higher fatty acids (waxy acids) with at least 15 C-atoms, as for instance palmitic acid, stearic acid, arachic acid, mixtures of fatty acids with 15 to 17 C-atoms and a softening point of 60° to 70° C. or mixtures of such waxes or materials having a waxlike consistency, occurring in natural waxes. A common natural wax with functional groups is beeswax.

Because some of these wax systems or fat-wax-systems solidify very slowly, particularly those containing paraffin and beeswax, it is advantageous to add 1 to 3% Aerosil when preparing confectionery products, calculated upon the whole weight of the batch in order to obtain compact comminutable masses. Here the amount of Aerosil used is a function of the melting point of the system, and, indeed the more Aerosil added, the lower melting point. Aerosil is a silicic acid, prepared by hydrolysis of $SiCl_4$ in an oxyhydrogen gas flame, containing more than 99.8% $SiO_2$.

The confection bases used in the process for the preparation of confectionery products are, according to the nature of the desired end-product, thermoplastic chewing masses, fondant masses, molding preparations, comprising for instance confectionery sugar and small amounts of binders (fat, starch, gelatin, tragacanth etc.) gelée masses, bonbon masses and similar materials which in given cases already contain a flavoring, aroma and/or active ingredient and to which in the process of the invention the flavoring, aroma and/or active ingredient, whose delayed release is sought, are added. Here, several flavorings, aromas and/or active ingredients may also be added in several wax systems to the base compound in order to obtain release at varying times.

In carrying out the process according to the invention, the flavorings, aromas and/or pharmaceutical active ingredients are dissolved in a wax having functional groups, as, for instance a mixture of fatty acids, or suspended therein and thereafter dispersed in a wax without functional groups, whose structure is between a fine grain and a paste. Preferably, the ratio of wax with functional groups to wax without functional groups is to be maintained in a ratio between 1:10 and 10:1. Flavoring, aroma and/or pharmaceutically active ingredients are added to the molten wax having functional groups in amounts from 2 up to 60%, calculated on the weight of the aforementioned wax.

Because the dispersed (or seemingly dissolved) part of the fatty acid physically influences the wax as an impurity, even short-chain waxy parts are prevented from crystallizing and amorphously solidify around the dispersed fatty acid or mixture of fatty acid esters. This effect results in a finely-structured enveloping of the droplets of fatty acid or fatty acid ester with water-insoluble amorphous wax, whereby the structure of this dispersion has a microscopic area when it is correctly prepared. When such structures are chewed, as for instance in a chewing gum, these amorphous pastes are squeezed by the motions of chewing and biting, and slowly release the incorporated flavors or active ingredients. The unexpected effect resulting from the invention arises as follows:

It is to be expected that a fatty acid such as stearic acid dissolves in paraffin. Aromatic materials, essential oils, special active ingredients, naturally will not dissolve in paraffins. However, when one dissolves peppermint oil in stearic acid and adds molten paraffin having a long chain length to this molten solution, a smooth distribution, free of precipitation occurs, wherein after rapid solidification, the water-insoluble paraffin solidly surrounds the stearic acid, also poorly soluble in water, together with the aromatic materials dissolved therein. A similar effect occurs in other systems, such as for example, beeswax as inner phase and polyethylene glycol of molecular weight 20,000 as outer phase, or any ester of a higher fatty acid as inner phase with a polyethylene wax having a chain length from 100 to 200 and a melting or softening point of preferably 20° C.

here, the extended release period strongly depends on the nature of the system. The more the outer phase tends to crystallize, the lower will be its occluding effect and the durability of the flavor. The finer the grain or the easier the wax can be prevented from microcrystallization, the longer the flavor will last. Thus systems as, for instance, beeswax in paraffin deliver relatively fast and last only a short time, while for instance a $C_{15}$–$C_{17}$ fatty acid ester together with a polyethylene wax of chain length =700, can give flavor lasting up to an hour.

A large group of systems may be compounded according to this invention: Three flavorings, for instance may be used:
(1) the normal flavoring, which, as usual for chewing gum, lasts 2 to 4 minutes,
(2) a fast releasing system, for instance based upon beeswax-paraffin, and
(3) a long lasting system, where a higher fatty acid ester and a polyethylene wax is chosen.

This invention makes it possible to incorporate changes of flavor in a single piece of chewing gum. For example an orange flavor lasting 2 to 4 minutes can be compounded with a slow release system such as an inner phase of stearic acid mixed with a fatty acid ester, together with an outer phase of propylene wax, which begins to release flavor after a delay of 3–4 minutes. When the slow release system contains peppermint oil, the result is a gum that gradually chages flavor from orange to peppermint.

The method is also applicable to the addition of medications to chewing gums. Oil-soluble active materials, as for instance dextromethorphan, may be inserted in the interior oil phase and their release retarded by addition to a polyolefin wax. The slow release conceals the bitter taste of the active ingredient and prolongs its action on the mucous membranes.

The same may be said for active materials of the type of dimethylamino-benzhydrylether. This antihistaminic and antiemetic active component is also oil-soluble and tastes extraordinarily bitter. Incorporation in one of these systems prevents this agent from tasting bitter while being chewed for longer times, because the local threshold for the bitter taste sensation is not exceeded.

Caffeine, for example, can be time-released from chewing gum. in which encapsulation prolongs the coffee flavor for 30 to 60 minutes, with minimal transmission to the mucous membranes.

Apart from variations in compsition, different modes of preparation give different effects.

As known from normal crystal systems, the structure of crystals will become finer, the faster the mixer has been cooled. Care must be taken that the molten inner phase which is added to the molten outer phase is cooled down quickly after mixing. That may be done by dripping the molten mixture onto a cooled metal plate which is coated with Teflon, whereby small lens-shaped structures automatically arise, which may be added in that shape to chewing gum or another edible product.

It is particularly advantageous when, from a suitable device, these molten mixtures, held by nitrogen or another inert gas under slight pressure, fall from a certain, experimentally-determined height upon the mixing or kneading mass so that they already arrive in a plastic state and that the resulting pasty droplets are at once caught and mixed in.

It is obvious that the use of two or more such devices above a kneader may succeed in creating the most diverse effects in flavors, as well as in certain active ingredients.

There is no absolute requirement according to the invention, to dissolve the active ingredients in the inner phase. Certain suspensions with long lasting effects may also be produced. It is for example important in the production of chewing gum to make the sweetener last for a long time, because taste sensations are not sufficiently felt in the absence of sweetener. All these systems may therefore contain saccharin or sodium cyclamate in micronized suspended form and will therefore also show a long lasting effect, which particularly heightens the taste sensations when accompanied by essential oils.

This is also possible with pharmaceutically active substances, for instance by micronizing a dextramethorphan hydrochloride instead of the aforementioned dextramethorphan and adding it as a suspension.

The invention will be explained in detail in the following examples, where all parts denote parts by weight:

EXAMPLE 1

50 parts polyethylene wax, chain length C 700, are melted in a container of pure aluminum which is preheated to 140° C. and in another container, 50 parts molten fatty acid ester, softening point 60°–70° C. is also brought to 120° C. 20 parts peppermint oil, 4 parts menthol and 2 parts pure saccharin are mixed in the second container and the mixture is transferred to the first container by nitrogen pressure. After mixing both phases under nitrogen, the mixture is dripped from a height of 2 meters through a heated valve and a cooled pipe vertically upon a cooled metal plate provided with a Teflon coating. At the end of the plate, the solidified droplets are taken off by a brush. Material obtained in this manner may be comminuted and may be worked into any confectionery product.

EXAMPLE 2

In the first container of example 1, 50 parts hard paraffin are melted at 110° C. and in the second container 30 parts of stearic acid are mixed with 20 parts orange oil and the solution is pumped in the first container with the aid of nitrogen. From there, the mixture is dripped through a 1 m long aluminum pipe, blown from the bottom upwardly by a stream of cold air directly into a Z-mixer with a chewing gum base at preferably 50° C.

EXAMPLE 3

50 parts polyethylene glycol of mol. wt. 20,000 are melted at 150° and 30 parts beeswax and 3 parts Aerosil are brought to solution with 20 parts menthol. Mixture 2 is added to mixture 1, resulting in a clear but viscous solution. The solution is quickly poured onto cooled plates and is, after solidification, ground in a cooled mill. The product may, for example, be worked into a chewing gum base.

EXAMPLE 4

30 parts fatty acid ester, melting point=60° to 70° C., are heated to 100° C. and 10 parts dextromethorphan is mixed with 15 parts menthol. Again nitrogen is used in fine bubbles for mixing and then 80 parts molten paraffin, mixed with 6% Aerosil, calculated on the weight of the end product, are pressed in.

EXAMPLE 5

100 parts polypropylene wax, chain length=500 are heated in a container to 120° C. and melted. In a similar container, 40 parts fatty acid ester are melted simultaneously and mixed with 20 parts dimethylaminohydroxy-benzhydrylether. The solution is pressed into the first container with nitrogen pressure and dripped upon a cooled metal plate.

EXAMPLE 6

A particularly prolonged effect is obtained by altering the ratios. For the preparation of a changing taste, the following mixture is dropped at preferably 50° to 60° C. into a chewing gum mixer, which already contains chewing gum ready for extrusion:

The first container contains 100 parts polypropylene wax, chain length=700, molten at a temperature of about 130° C. The second container contains 20 parts fatty acid ester, melting point 60° to 70° and 10 parts fatty acid togetherwith 20 parts menthol and 25 parts peppermint oil. This mixture is micronized with 3 parts pure saccharin under nitrogen and suspended. After pressing phase 2 into phase 1 by a nitrogen stream and mixing therewith, the mixture is again dripped from 1 to 2 m height onto the running kneader. In the kneader, a discharge-ready chewing gum mass is disposed at about 60° C., which has been flavored orange in the usual way. A product forms having about 2 minutes orange taste which slowly becomes peppermint and menthol. By this method, certain kinds of confectionery goods may also be provided with two tastes, as for instance fondant, bonbons, pralines and certain sugar masses having a prolonged residence time within the mouth. In particular, it was observed that the high molecular waxes have a tendency to attach themselves to the mucous membranes of the mouth and to produce additional taste sensations shortly after swallowing the bonbon or also after removal of the chewing gum.

I claim:

1. A confectionery product comprising a confection having an inner and outer phase and an additive selected from the group consisting of syrup, sweetener, coloring, flavoring, aroma, caffeine and mixtures thereof, wherein the additive is contained in said inner phase as a solid solution or a mixture therewith, said inner phase comprising at least one wax with functional groups with which the additive is miscible, said outer phase comprising at least one second wax without functional groups with which the additive is immiscible and which surrounds the additive-containing inner phase and forms a homogeneous mixture or solid solution therewith.

2. A confectionery product according to claim 1, wherein the wax without functional groups is a paraffin wax.

3. A confectionery product according to claim 1, wherein the wax without functional groups is a polyethylene wax.

4. A confectionery product according to claim 1, wherein the wax without functional groups is a polyethylene glycol wax.

5. A confectionery product according to claim 1, wherein the wax with functional groups is formed by at least one higher fatty-alcohol, at least one higher fatty acid, or at least one higher fatty acid ester having a waxy consistency, or mixtures thereof.

6. A confectionery product according to claim 5, wherein the wax with functional groups is stearic acid.

7. A confectionery product according to claim 6, wherein the wax with functional groups is beeswax.

8. A process for the production of a confectionery product according to claim 1, wherein said additive is mixed with a melt of the wax with functional groups, the resulting mixture is added to a melt of the wax without functional groups and substantially immiscible with said additive and the resulting mixture is mixed into the confectionery base of said confectionery product.

9. A process according to claim 8 wherein the confection base is chewing gum base which, during the step of being mixed with the mixture of waxes, is held at a temperature between 60° and 80° C.

10. A process according to claim 8 wherein the confection base is a molten bonbon base.

11. A process according to claim 8 wherein the wax without functional groups is a paraffin wax.

12. A process according to claim 8 wherein the wax without functional groups is a polyethylene wax.

13. A process according to claim 8 wherein the wax without functional groups is a polyethylene glycol wax.

14. A process according to claim 8 wherein the wax with functional groups is a higher fatty alcohol, a higer fatty acid, a higher fatty acid ester, or a mixture thereof.

15. A process according to one of claims 8 to 14, wherein the mixture of waxes, before being added to the confection base is cooled quickly by being placed on a cooling surface.

16. A process according to one of claims 8 to 14 wherein the mixture of waxes, in a molten state and under the pressure of an inert gas, is allowed to drip upon said confection base in order to mix therewith in droplet form.

17. A process according to one of claims 8 to 14 wherein the weight ratio of the wax with functional groups to the wax without functional groups is between 1:10 and 10:1.

18. A process according to one of claims 8 to 14 wherein the weight of additive is from 2 to 60% the weight of wax with functional groups.

* * * * *